(12) United States Patent  
Kerner

(10) Patent No.: US 6,552,300 B2
(45) Date of Patent: Apr. 22, 2003

(54) LASER MARKING ON DIAMONDS

(75) Inventor: Abraham Kerner, Herzelia (IL)

(73) Assignee: Sarin Technologies, Ltd., Ramat-gan (IL)

( * ) Notice: Subject to any disclaimer, the term of this patent is extended or adjusted under 35 U.S.C. 154(b) by 0 days.

(21) Appl. No.: 09/919,810

(22) Filed: Aug. 2, 2001

(65) Prior Publication Data

US 2002/0030039 A1 Mar. 14, 2002

(30) Foreign Application Priority Data

Sep. 8, 2000 (IL) ................................................ 138347

(51) Int. Cl.⁷ ............................................... B23K 26/00
(52) U.S. Cl. ................................................. 219/121.68
(58) Field of Search ...................... 219/121.68, 121.69, 219/121.73, 121.77, 121.6, 121.85

(56) References Cited

U.S. PATENT DOCUMENTS

| 4,392,476 A | | 7/1983 | Gresser et al. |
|---|---|---|---|
| 4,467,172 A | * | 8/1984 | Ehrenwald et al. |
| 5,029,243 A | * | 7/1991 | Dammann et al. |
| 5,373,137 A | * | 12/1994 | McLaughlin |
| 5,410,125 A | | 4/1995 | Winston et al. |
| 5,573,684 A | | 11/1996 | Winston et al. |
| 5,932,119 A | | 8/1999 | Kaplan et al. |
| 6,031,201 A | * | 2/2000 | Amako et al. |

FOREIGN PATENT DOCUMENTS

EP 0 054 840 6/1982

* cited by examiner

Primary Examiner—Samuel M. Heinrich
(74) Attorney, Agent, or Firm—Burns, Doane, Swecker & Mathis, L.L.P.

(57) ABSTRACT

A diamond marking attachment comprising a laser, for a 3D diamond mapping apparatus, and a method of laser marking on a diamond surface, via a material that is capable of interacting with a laser beam either in a way that this material is permanently changed and turns into a char mark that adheres to the diamond surface, or in a way that a permanent mark is etched through the material into the diamond surface.

27 Claims, 3 Drawing Sheets

LASER MARKING ON DIAMONDS

FIELD OF THE INVENTION

The present invention is in the field of laser marking on diamonds.

BACKGROUND OF THE INVENTION

Marking on diamonds is required for such purposes as their sawing or indicia stamping (identification and quality marks, etc).

For marking various indicia on a diamond surface, different laser marking techniques are known to be employed as suggested, for example, in U.S. Pat. Nos. 5,410,125, 5,573,684 and EP 0 054 840.

In order to obtain durable marking with the known laser marking techniques, a high level of laser energy density is used, which may adversely affect the value of the diamond by heating and vaporizing a portion of its body and/or causing microcracks. The required graphics of the indicia is achieved through the employment of various means including complex optical axis tilting, numerous X-Y tables, partial masking, etc.

For sawing purposes, predetermined 'sawing lines' are marked on diamond surfaces and actual sawing is performed in accordance with these lines. The marks are nowadays drawn manually, with ink dots representing the lines. Positions of the dots are chosen by eye judgment either alone, or aided by various CAM devices such as the DiaExpert 2000 by Sarin Technologies Ltd. in Israel.

SUMMARY OF THE INVENTION

According to one aspect of the present invention, there is provided an attachment to 3D diamond mapping apparatus, for diamond laser marking. The 3D mapping apparatus is capable of mapping a diamond whose surface is to be marked with a marking pattern, and of determining a succession of points representing said pattern. The attachment comprises a laser source with its associated focusing optics for emitting a focused laser beam along an optical path which extends between said source and a marking position on said surface of the diamond and a beam orientation system to move said path relative to the diamond and to thereby bring it to said marking position. The mapping apparatus and the attachment constitute, at least in operation, an integral mapping and marking system whose computer means calculates coordinates of each point of the marking pattern and manipulates said beam orientation system to direct the laser beam successively to said points.

In accordance with another aspect of the present invention, there is provided a method of permanent laser marking allowing the use of lower laser power by means of coating the diamond prior to its marking and performing the marking through or on the coating.

The present invention, in accordance with both aspects thereof, can be used for performing any marking on any diamonds, but it is particularly advantageous for diamond CAM laser marking of 'sawing lines'.

BRIEF DESCRIPTION OF DRAWINGS

In order to understand the invention and to see how it may be carried out in practice, a preferred embodiment will now be described, by way of non-limiting example only, with reference to the following drawings of which.

DETAILED DESCRIPTION OF EMBODIMENTS

Figure 1:
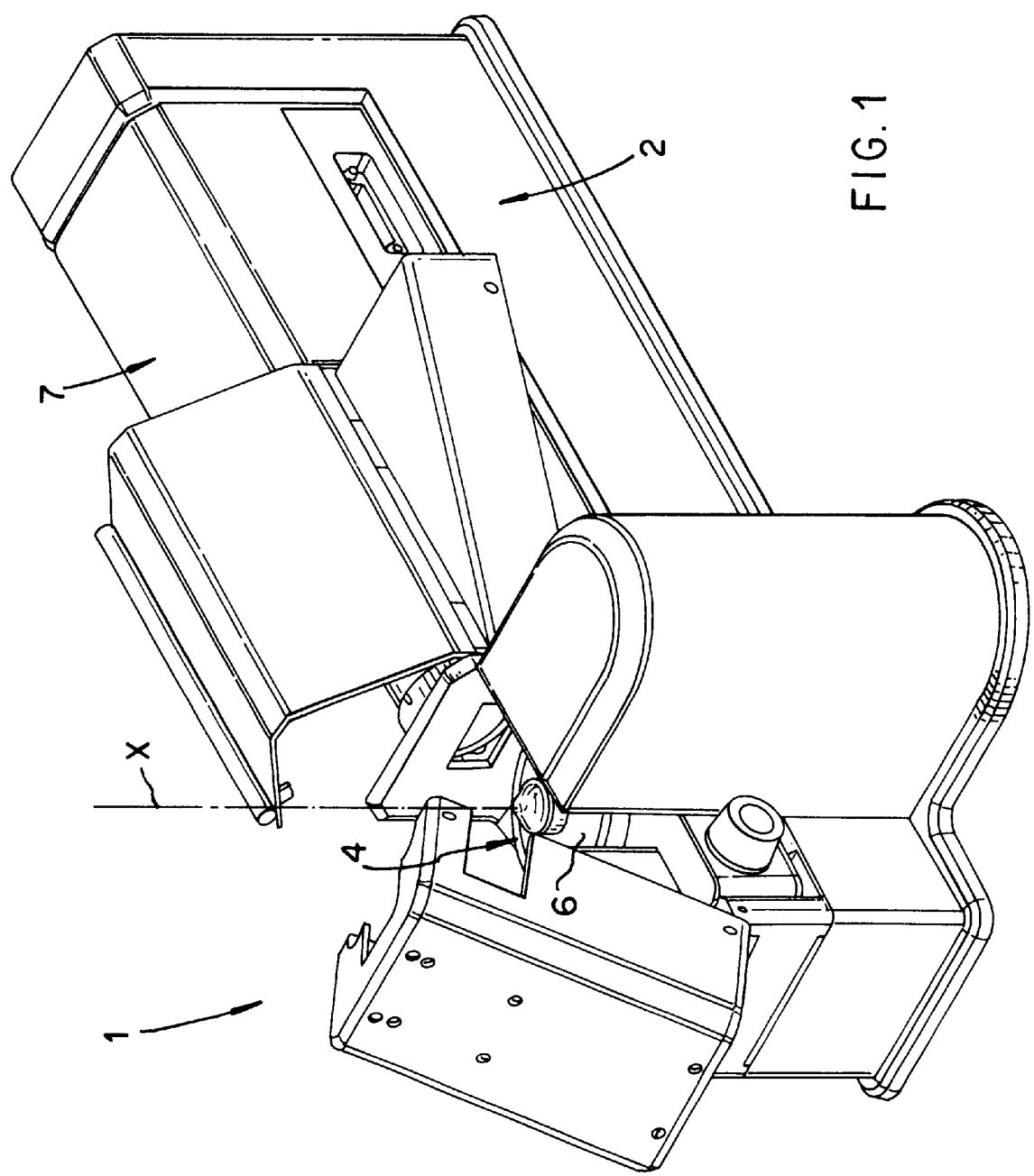
FIG. 1 is an illustration of a system for 3D mapping and laser marking of diamonds, according to the present invention.

FIG. 1 shows a system for 3D mapping and marking of a diamond A, according to the present invention. The system comprises a mapping apparatus 1 and a marking attachment 2 integrally assembled with each other, and a computer (not shown) to control the operation of the apparatus and the attachment.

The mapping apparatus 1 is preferably of the kind as the DiaExpert 2000 manufactured by Sarin Technologies Ltd., Israel. The marking apparatus comprises a turntable 4 with a central axis X of rotation and a top surface 6 having means for the fixation thereon of the diamond A, and illumination, imaging and image processing means (not shown) mounted in a housing 7 of the apparatus, for generating a map of the diamond A and for determining a succession of marking points representing a pattern to be marked thereon. The pattern may be a 'sawing line' or indicia of any kind such as identification barcodes, quality marks, arbitrary inscriptions, etc. As shown schematically in FIG. 2, in the system of the present invention, each marking point P of the pattern is considered to have coordinates defined by an angle θ to which the diamond A needs to be rotated by the turntable 4 to bring the point P into its marking position, by a distance D between the marking point P and the central axis X, and by a height H of the point P relative to the top surface 6.

Figure 2:
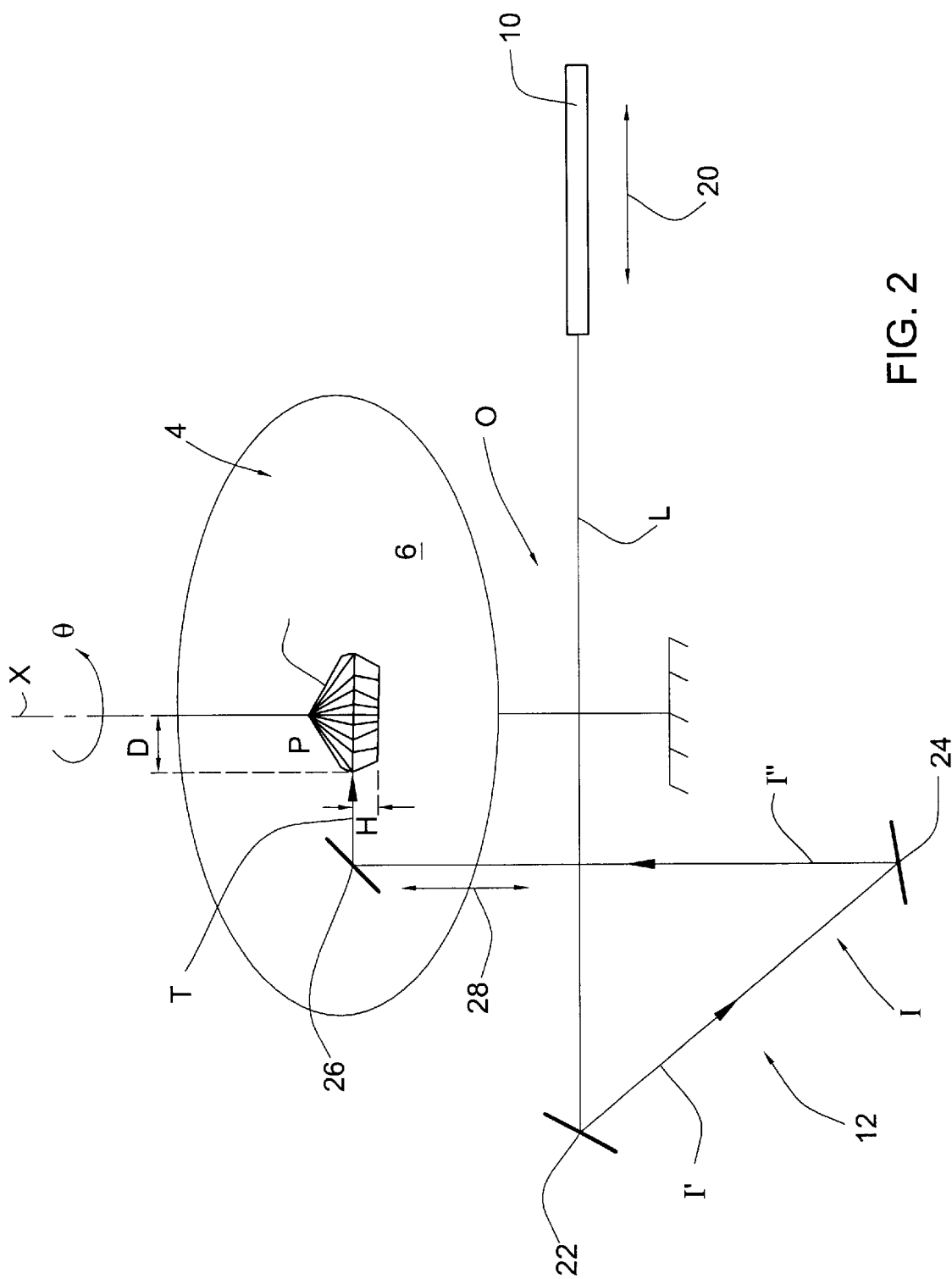
FIG. 2 is a schematic illustration of the optical set-up of the marking attachment of the system of FIG. 1.

FIG. 2 schematically illustrates an optical set-up of the marking attachment 2, comprising a laser source 10 for emitting a focused laser beam along an optical path O which extends between the laser source 10 and the marking point P of the diamond on its surface to be marked, and a beam orientation system generally designated as 12 for the orientation of the optical path in such a manner as to bring the laser beam to the point P. The beam orientation system is designed to ensure that the laser beam is focused at a location spaced from the central axis X by the distance D and spaced from the top surface 6 of the turntable 4 by the distance H, with the point P being brought in its marking position by the rotation of the turntable 4.

As shown in FIG. 2, the beam orientation system divides the optical path O into a leading section L, a trailing section T and an intermediate section I therebetween. The leading section L lies in a first horizontal plane parallel to the top surface 6 of the turntable 4 and located under it, and is oriented in the direction in which the laser 10 emits its focused beam. The trailing section T lies in a second horizontal plane parallel to the top surface 6 and located above it, and is oriented perpendicular to and passing through the central axis X. The intermediate section I is comprised of two mutually perpendicular sub-sections I' and I", the sub-section I' lying in the first horizontal plane and the sub-section I" lying in a vertical plane that is perpendicular to the first and second horizontal planes and passes through the central axis X.

The above optical set-up of the beam orientation system is obtained by the system comprising a laser displacement device schematically shown as 20, first, second and third laser beam diverting optics schematically shown as 22, 24 and 26, respectively, and by a diverting optics displacement device schematically designated as 28.

Figure 3:
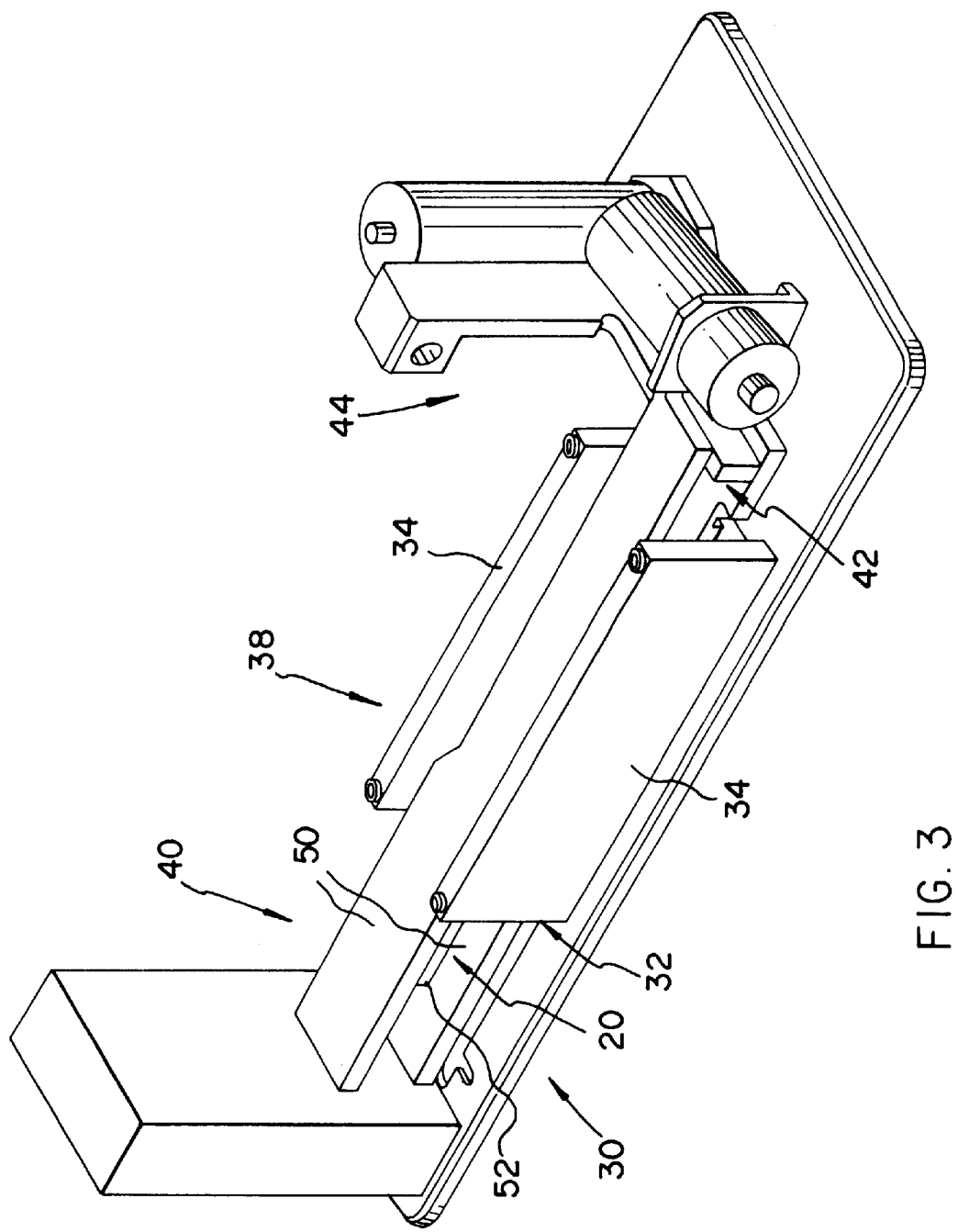
FIG. 3 is an illustration of the mechanical design of the marking attachment of FIG. 2.

FIG. 3 shows a mechanical design of the marking attachment 2 (without the optical components of the attachment shown in FIG. 2), which is in the form of a base 30 with an elongated frame 32 having supporting surfaces 34 for mounting thereon the mapping apparatus 1 (shown in FIG. 1) and a hollow area 38 between the supporting surfaces. The hollow area 38 accommodates the laser displacement device 20 adjacent one end 40 of the hollow area, for carrying thereon the laser 10 with its focusing optics, and the first laser beam diverting optics 22 adjacent the other end 42 thereof. The base 30 is further formed with a compartment 44 for accommodating therein second and third laser beam diverting optics 24 and 26 and the diverting optics displacement device 28 for the diverting optics 26.

As seen in FIG. 3, the laser displacement device 20 comprises guides 50 and a cartridge 52 displaceable along the guides and capable of carrying thereon the laser 10 with its focusing optics, so as to ensure that the leading section L of the optical path (FIG. 2) extends within the hollow area 24 in the second plane.

The diverting optics displacement device 28 may be of any appropriate kind, e.g. may be similar to the laser displacement device, to enable moving the diverting optics 26 parallel to the central axis X.

The computer is provided with an appropriate software to manipulate the motions of the turntable 4, the laser displacement device 20 and the diverting optics displacement device 28 in accordance with the marking pattern and, possibly, to trigger the laser source 10 to irradiate the diamond surface at the succession of its marking points corresponding to the pattern. Preferably, the computer is also capable of generating appropriate corrections when the diamond surface to be marked is not perpendicular to the trailing section T of the optical path at each of the points.

In operation, a diamond A is fixed at the center of the turntable 6 and the mapping apparatus creates its 3D model, based on which its marking pattern, such as for example a sawing plan, is defined manually or automatically by using optimization programs stored in the system's software, and coordinates of the marking points of the pattern are calculated. Similarly, any data or graphics that need to be imprinted anywhere on the diamond's surface can be translated to the coordinates.

The laser source 10 may be any laser with the power suitable to create a permanent mark at each of the marking points. Preferably, the laser source is a low power laser source. For example, the laser source may have an average power of 34.5 mW, at wavelength of 1064 nm, pulse energy approximately 8 $\mu$Joul and pulse repetition of approximately 3.8 KHz.

To enable the use of the above low power laser source in general and, particularly with the marking system of the present invention, it is suggested to coat the diamond that is to be marked with a solution of a co-polymer in a hydrocarbon solvent such as styrene-butadiene co-polymer (K-Resin made by Philips) in cyclohexane, tinted with white pigment, such as a commercial concentrate of titanium dioxide in a paraffin solution. Typical solution is made of 3% K-Resin and 5% titanium dioxide in cyclohexane.

With the coated diamond to be marked being irradiated by the lower power laser, the coating reacts on the laser radiation in a way that a permanent mark is imprinted on the surface of the aforesaid diamond. This happens due to the optical breakdown and plasma formation at the irradiated region of the coating, which plasma is responsible for the chemical attack on the surface of the diamond and the etching thereof. The laser power needed for the plasma formation of the coating material is lower than that which is necessary to directly etch the diamond itself. In particular, an average laser power less than 50 mW would be sufficient versus 500 mW to 5 kW which is required for direct diamond marking.

Alternatively, the diamond to be marked may be coated with a material which, when irradiated by a lower power laser beam, is carbonized and thus produces char that adheres permanently onto the diamond surface, at much lower laser power than the power that would have been required for achieving such marking directly on the diamond surface without the coating. Such material may, for example, be chosen from a silver compound in the form of a suspension prepared from silver carbonate. However, since the density of silver carbonate is higher than that of ordinary solvents used in the preparation of the suspension, various additives have to be added thereto, such as resins, silica, etc. One example of such suspension is a suspension prepared by grinding and suspending the following components (expressed in % weight percent): 60 parts 10% K-Resin (Philips Chemicals, a polystyrene copolymer) in 60/40 hexane/dichloromethane; 35 parts cyclohexane, 3.6 parts silver carbonate; 0.5 parts 10% calcium/barium petronate dispersant; 0.5 parts silica flatting agent, OK-500 by Degussa; and 0.36 parts fumed silica, Cab-O-Sil 720 by Cabot. The suspension should be stirred before its application to a diamond, to prevent settling of its solid components.

What is claimed is:

1. A diamond marking attachment for a 3D diamond mapping apparatus capable of generating a map of a diamond whose surface is to be marked with a predetermined pattern and of determining a succession of marking points representing said pattern, said attachment comprising:
   a laser source with its associated focusing optics for emitting a focused laser beam along an optical path;
   marking position establishing system to move the optical path relative to the diamond and to thereby bring them both in a marking position, and
   computer means to manipulate said marking position establishing to bring the laser beam and the diamond into said marking position successively in each of said marking point.

2. An attachment according to claim 1, wherein said marking position establishing system comprises a diamond orientation means and a beam orientation means.

3. An attachment according to claim 2, wherein said mapping apparatus has a turntable with a central axis of rotation and a top surface for the fixation thereon of said diamond, said turntable constituting said diamond orientation means.

4. An attachment according to claim 2, wherein said beam orientation system is capable of adjusting the length of said optical path and of moving said path along said central axis.

5. An attachment according to claim 4, further comprising a base with said laser source and said beam orientation system mounted therein, the base having support surfaces for mounting thereon said diamond mapping apparatus, said computer means being capable of manipulating both said apparatus and said attachment.

6. An attachment according to claim 5, wherein said beam orientation system comprises a laser displacement device for computer controlled linear displacement of said laser source with its associated focusing optics along a leading section of the optical pat and thereby adjusting the length of the optical path.

7. An attachment according to claim 6, wherein said base has guides and said laser displacement device is in the form of a cartridge displaceable along said guides and carrying said laser with its focusing optics.

8. An attachment according to claim 7, wherein said base is in the form of a frame having a hollow area between said support surfaces for locating therein said laser source so as to ensure that said leading section of the optical path extends within said hollow area in a first plane oriented perpendicular to sad central as and disposed under said top surface of the turntable.

9. An attachment according to claim 8, wherein said beam orientation system further comprises optical components mounted in said base to bring the optical path from said leading section to a trailing portion lying in a second plane parallel to and located above said top surface of the turntable.

10. An attachment according to claim 9, wherein at least one of said optical components is movable along an axis parallel to said central axis.

11. An attachment according to claim 1, wherein said computer means is capable of generating appropriate position corrections whenever the diamond surface to be marked is not in its predetermined position.

12. An attachment according to claim 1, wherein said pattern is a sawing line generated by said mapping system.

13. An attachment according to claim 1, wherein said pattern is of the kind to be introduced into said mapping system by a user.

14. An attachment according to claim 13, wherein said pattern is an identification code.

15. An attachment according to claim 13, wherein said pattern is an arbitrary inscription.

16. A method of laser marking on a diamond surface comprising the steps of:
   (a) coating the diamond surface with a material that is capable of interacting with a laser beam in a way that a permanent mark is etched therethrough into the diamond surface, at much lower laser power $E_1$ then the power $E_2$, that would have been required for achieving such marking directly on the diamond surface without the coating; and
   (b) marking the coated diamond surface with a focused laser beam of the power $E_1$.

17. A method according to claim 16, wherein step (b) is performed by a diamond marking machine having a laser source of the power $E_1$ and capable of moving intermittently to successive points on the surface in accordance with a predetermined pattern.

18. A method according to claim 16, wherein said pattern is a sawing line generated by said mapping system.

19. A method according to claim 16, wherein said pattern is of the kind to be introduced into said mapping system by a user.

20. A method according to claim 16, wherein said pattern is an identification code.

21. A method according to claim 16, wherein said pattern is an arbitrary inscription.

22. A method of laser marking on a diamond surface comprising the steps of:
   (a) coating the diamond surface with a material that is capable of interacting with a laser beam in a way that said coating material is permanently changed and turns into a char mark that adheres to the diamond surface, at much lower laser power $E_3$ than the power $E_2$ that would have been required for achieving such marking directly on the diamond surface without the coating and
   (b) marking the coated diamond surface with a focused laser beam having the power $E_3$.

23. A method according to claim 18, wherein step (b) is performed by a diamond marking machine having a laser source having the power $E_3$ and capable of moving intermittently to successive points on the surface in accordance with a predetermined pattern.

24. A method according to claim 22, wherein said pattern is a sawing line generated by said mapping system.

25. A method according to claim 22, wherein said pattern is of the kind to be introduced into said mapping system by a user.

26. A method according to claim 22, wherein said pattern is an identification code.

27. A method according to claim 22, wherein said pattern is an arbitrary inscription.

* * * * *

UNITED STATES PATENT AND TRADEMARK OFFICE
CERTIFICATE OF CORRECTION

PATENT NO. : 6,552,300 B2   Page 1 of 1
DATED : April 22, 2003
INVENTOR(S) : Abraham Kerner It is certified that error appears in the above-identified patent and that said Letters Patent is hereby corrected as shown below:

Column 4,
Lines 42-44, should read as:
-- establishing system to bring the laser beam and the diamond
 into said marking position successively in each of said
 marking points. --

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,552,300 B2
DATED : April 22, 2003
INVENTOR(S) : Abraham Kerner

It is certified that error appears in the above-identified patent and that said Letters Patent is hereby corrected as shown below:

<u>Column 4,</u>
Line 66, should read as:
-- the optical path and thereby adjusting the length of the optical --

<u>Column 5,</u>
Line 10, should read as:
-- lar to said central axis and disposed under said top surface of --

Signed and Sealed this

Seventeenth Day of August, 2004

JON W. DUDAS
*Acting Director of the United States Patent and Trademark Office*